US010019583B2

(12) United States Patent
Swidowski et al.

(10) Patent No.: US 10,019,583 B2
(45) Date of Patent: Jul. 10, 2018

(54) METHOD AND APPARATUS FOR PERFORMING PROTECTED WALK-BASED SHADOW PAGING USING MULTIPLE STAGES OF PAGE TABLES

(71) Applicant: Samsung Electronics Co., Ltd., Suwon-si (KR)

(72) Inventors: Kirk R. Swidowski, Mountain View, CA (US); Ahmed M. Azab, Mountain View, CA (US)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 111 days.

(21) Appl. No.: 15/089,376

(22) Filed: Apr. 1, 2016

(65) Prior Publication Data
US 2017/0286694 A1 Oct. 5, 2017

(51) Int. Cl.
*G06F 21/60* (2013.01)
*G06F 12/10* (2016.01)
(Continued)

(52) U.S. Cl.
CPC .......... *G06F 21/60* (2013.01); *G06F 9/45558* (2013.01); *G06F 12/1009* (2013.01);
(Continued)

(58) Field of Classification Search
CPC .. G06F 21/60; G06F 9/45558; G06F 12/1009; G06F 2009/45583;
(Continued)

(56) References Cited

U.S. PATENT DOCUMENTS 5,764,944 A * 6/1998 Hwang ............... G06F 12/1027
711/202
8,443,156 B2 5/2013 Adams et al.
(Continued)

FOREIGN PATENT DOCUMENTS

WO WO2014/021919 A2 6/2014

OTHER PUBLICATIONS

Intel 64 and IA-32 Architectures Software Developer's Manual Combined vols. 3-8 vol. 1, 5-30 vol. 1, D-18 vol. 1, D-19 vol. 1, 3-529 vol. 2A, 29-5 vol. 3C, 29-6 vol. 3C, Dec. 2015, 7 pgs.
(Continued)

Primary Examiner — Glenn Gossage

(57) ABSTRACT

A Protected Walk-based Shadow Paging (PWSP) method includes storing a multiple level first stage (S1) page tables structure in second stage (S2) page tables. The method includes: when an S1 page table in an S2 page table entry is marked with a writable attribute: (i) permitting an operating system (OS) to write to the S1 page table, (ii) blocking a memory management unit (MMU) from reading the S1 page table for translation, and (iii) in response, verifying the S1 page table for translation and changing the marking of the S1 page table in the S2 page table entry to a read-only attribute, enabling the MMU to subsequently read the S1 page table. The method further includes: when the S1 page table in the S2 page table entry is marked with the read-only attribute: (i) permitting the OS to read the S1 page table for translating from a virtual address to an intermediate physical address, (ii) blocking the OS from writing to the S1 page table, and (iii) in response to blocking the OS, updating the S1 page table and changing the marking of the S1 page table in the S2 page table entry to the device memory attribute, enabling the OS to write to the S1 page table. Blocking the MMU from reading the S1 page table for translation may include generating a device memory permissions fault, and blocking
(Continued)

the OS from writing to the S1 page table may include generating a read-only prefetch permissions fault.

24 Claims, 7 Drawing Sheets

(51) Int. Cl.
   *G06F 9/455* (2018.01)
   *G06F 12/1009* (2016.01)
   *G06F 12/109* (2016.01)

(52) U.S. Cl.
   CPC .. *G06F 12/109* (2013.01); *G06F 2009/45583* (2013.01); *G06F 2212/1052* (2013.01); *G06F 2212/151* (2013.01); *G06F 2212/152* (2013.01); *G06F 2212/651* (2013.01)

(58) Field of Classification Search
   CPC ....... G06F 2212/1052; G06F 2212/152; G06F 12/109; G06F 2212/151; G06F 2212/651
   See application file for complete search history.

(56) References Cited

U.S. PATENT DOCUMENTS

| | | |
|---|---|---|
| 2007/0016755 A1 | 1/2007 | Pratt |
| 2009/0113110 A1* | 4/2009 | Chen ..................... G06F 9/4426 711/6 |
| 2009/0292899 A1* | 11/2009 | Mansell .............. G06F 12/1009 711/207 |
| 2009/0300263 A1 | 12/2009 | Devine et al. |
| 2010/0318762 A1* | 12/2010 | Malyugin ........... G06F 12/1027 711/207 |
| 2011/0010483 A1* | 1/2011 | Liljeberg ............ G06F 12/1441 711/6 |
| 2013/0091318 A1 | 4/2013 | Bhattacharjee et al. |
| 2014/0122830 A1 | 5/2014 | Cohen et al. |
| 2015/0089150 A1 | 3/2015 | Kessler et al. |
| 2015/0199507 A1* | 7/2015 | Azab ...................... G06F 21/53 726/22 |
| 2017/0168865 A1* | 6/2017 | Swidowski ......... G06F 9/45558 |

OTHER PUBLICATIONS

ARM ; "ARM Cortex -A53 MPCore Processor Revision: r0p4"; Feb. 8, 2016; Retrieved from the Internet: URL: http://infocenter.arm.com/help/topic/com.arm.doc.ddi0500g/DDI0500G_cortex_a53_trm.pdf, approx . 620 pages.
Anonymous; "include/public/xen.h-arch-x86_64—Xen public headers"; Mar. 7, 2016; Retrieved from the Internet: URL: https://web.archive.org/web/20160307174551/https://xenbits.xen.org/docs/unstable/hypercall/x86_64/include,public,xen.h.html#Func_HYPERVISOR_mmu_update [retrieved on Jul. 11, 2017], 14 pages.
Foreign Communication from Related Counterpart Application; European Patent Application No. 17167254.9; Extended European Search Report and European Search Opinion dated Jul. 20, 2017; 11 pages.
Enhancing Virtualized Application Performance Through Dynamic Adaptive Paging Mode Selection; Chang S. Bae et al. ; ICAC'11, Jun. 14-18, 2011, Karlsruhe, Germany—10 Pages.
Revisiting Hardware-Assisted PageWalks for Virtualized Systems; Jeongseob Ahn et al.; Appears in the 39th International Symposium on Computer Architecture (ISCA 2012); 12 Pages.
Shadow paging; Shadow paging—Wikipedia, the free encyclopedia; https://en.wikipedia.org/wiki/Shadow_paging[Apr. 1, 2016 1:49:04 PM]—2 Pages.

* cited by examiner

METHOD AND APPARATUS FOR PERFORMING PROTECTED WALK-BASED SHADOW PAGING USING MULTIPLE STAGES OF PAGE TABLES

TECHNICAL FIELD

The present application relates generally to virtual machine monitoring, and more specifically, to protected walk-based shadow paging.

BACKGROUND

The act of virtualizing memory translation tables (such as Shadow Paging) of a guest Operating System (OS) is a technique used by a Virtual Machine Monitor (VMM) to maintain control over the guest OS's access to physical memory. Shadow Paging is expensive, variations of Shadow Paging that are intended to optimize performance can be found in U.S. Pat. No. 8,443,156 and U.S. Patent Application Publication No. US 2014/0122830. INTEL CORPORATION defined the steps required to implement a Virtual Translation Lookaside Buffer (vTLB), and the approach has been adapted to work on other architectures and their associated Virtualization Extensions. Shadow Paging and the variations of Shadow Paging techniques in the above-described patents are used to support systems running multiple guests.

Security monitoring tools need to be isolated from the system they wish to monitor to ensure their own integrity. This can be accomplished by running the monitor at a higher privilege level from the system (e.g., Hypervisor, Trust-Zone®, System Management Mode) if an OS is to be monitored. At the same time, security monitoring tools require the ability to inspect the state of the OS to: (i) verify its integrity; and (ii) detect or prevent its compromise from applications that it is managing (e.g., Internet Browsers, E-Mail Clients, PDF readers).

One technique to achieve the security capabilities described above is to prevent lesser privileged software from performing potentially harmful activities after the lesser privileged software has been initialized. An attacker may attempt to break into a higher privilege level or maintain control of a privilege level the attacker has already broken into. Specifics include: (1) Mapping memory as writable and executable (allows for uncontrollable self-modifying code); (2) Mapping read-only data as writable (allows for constant variables to be manipulated); (3) Mapping physical memory at multiple locations with different attributes (readable writable at one and read-only executable at another); and (4) Mapping executable memory at multiple privilege levels (allowing an OS and an application to execute from the same memory location).

While the basic Memory Management Unit (MMU) provides the ability to perform all of these activities, the MMU itself can be manipulated from within the context of the OS so if that privilege level is compromised, the MMU can no longer maintain control over these structures.

One approach to providing introspection capabilities to an out-of-band monitor is to implement Shadow Paging. Shadow Paging forces all address translation regime changes, page faults, and translation lookaside buffer (TLB) maintenance operations to be trapped by the out-of-band monitor, which consumes a lot of computing resources.

SUMMARY

This disclosure describes an apparatus and method for performing Protected Walk-based Shadow Paging.

In a first embodiment, an apparatus includes two, or more, sets of page tables. The first set, also referred to as first stage page tables, can have multiple levels. For example, the first stage page tables can include a level one (L1) page table and level two (L2) page table. The second set of page tables, also referred to as second stage page tables, is configured to store the first stage page tables, (including the level one (L1) page table and the level two (L2) page tables of the first stage page tables). The apparatus includes a hypervisor configuration register (HCR) configured to store a protected table walk (PTW) bit. The apparatus includes processing circuitry configured to: when the L1 page table is marked according to a first attribute: (i) permit an operating system (OS) to write to at least one entry in the L1 page table, (ii) block a memory management unit (MMU) from reading from the L1 page table for translation, (iii) when the MMU attempts to read the L1 page table for translation, trap an event to an isolated security monitor, and (iv) in response to trapping the event to the isolated security monitor, verify the L1 page table for translation and change the marking of the L1 page table according to a second attribute, enabling the MMU to subsequently read from the L1 page table for translation. The processing circuitry is additionally configured to: when the L1 page table is marked according to the second attribute: (i) permit the OS to read from the L2 page table for translating from a virtual address to an intermediate physical address (IPA) to a physical address, (ii) block the OS from writing to the L1 page table, (iii) when the OS attempts to write to the L1 page table for translation, trap an event to an isolated security monitor, and (iv) in response to trapping the event to the isolated security monitor, block the OS, update the L1 page table and change the marking of the L2 page table that is pointed to by the updated L1 page table entry according to the first attribute, enabling the OS to subsequently write to the L2 page table.

In a second embodiment, a method includes storing a multiple level page tables structure of first stage page tables in second stage page tables. The multiple level page tables structure includes a level one (L1) page table and a level two (L2) page table. The method includes storing a protected table walk bit in a hypervisor configuration register. The method includes: when the page tables of the multiple level page tables structure are marked according to a first attribute: (i) permitting an operating system (OS) to write to at least one entry in the page tables of the multiple level page tables structure, (ii) blocking a memory management unit (MMU) from reading from the page table for translation, (iii) when the MMU attempts to read the page tables of the multiple level page tables structure for translation, trapping an event to an isolated security monitor, and (iv) in response to trapping the event to the isolated security monitor, verifying the page tables of the multiple level page tables structure for translation, and changing the marking of the page tables of the multiple level page tables structure according to a second attribute, enabling the MMU to subsequently read from the page tables of the multiple level page tables structure for translation. The method includes: when the page tables of the multiple level page tables structure are marked according to the second attribute: (i) permitting the OS to read from the page tables of the multiple level page tables structure for translating from a virtual address to an intermediate physical address (IPA) to a physical address, (ii) blocking the OS from writing to the page tables of the multiple level page tables structure, and (iii) in response to blocking the OS, updating the entries of the page tables of the multiple level page tables structure and changing the marking of subsequent page tables of the multiple level page tables structure according to the first attribute, enabling the OS to subsequently write to the page tables of the multiple level page tables structure. In the method, marking of the subsequent page tables includes at least one of: (i) marking the L2 page table for entries in the L1 page table or (ii) marking an L3 page table for entries in the L2 page table.

In a third embodiment, a system comprises a processor, a computer readable medium electronically coupled to the processor, and a plurality of instructions. At least a portion of the plurality of instructions may be stored in the computer readable medium. The plurality of instructions are configured to cause the processor to perform the steps of: controlling an operating system to translate from a virtual address to an Intermediate Physical Address (IPA) using first stage page tables. The first stage page tables include a multiple level page tables structure that includes a level one (L1) page table and a level two (L2) page table. The plurality of instructions are configured to cause the processor to perform the steps of: controlling a hypervisor to translate from the IPA to a Physical Address. The hypervisor includes second stage page tables configured to store the L1 and L2 page tables according to different memory attributes. The hypervisor includes a hypervisor configuration register (HCR) configured to store a protected table walk (PTW) bit. The plurality of instructions are configured to cause the processor to perform the steps of: when the L1 page table is marked according to a first attribute: (i) permitting the OS to write to at least one entry in the L1 page table, (ii) blocking a memory management unit (MMU) from reading from the L1 page table for translation, (iii) when the MMU attempts to read the L1 page table for translation, trapping an event to an isolated security monitor, and (iv) in response to trapping the event to the isolated security monitor, verifying the L1 page table for translation and changing the marking of the L1 page table according to a second attribute, enabling the MMU to subsequently read from the L1 page table for translation. The plurality of instructions are configured to cause the processor to perform the steps of: when the L1 page table is marked according to the second attribute: (i) permitting the OS to read from the L1 page table for translating from a virtual address to an intermediate physical address (IPA) to a physical address, (ii) blocking the OS from writing to the L1 page table, (iii) when the OS attempts to write to the L1 page table for translation, trapping an event to an isolated security monitor, and (iv) in response to trapping the event to the isolated security monitor, blocking the OS, updating the L1 page table and changing the marking of the L2 page table that is pointed to by the updated L1 page table entry according to the first attribute, enabling the OS to subsequently write to the L2 page table.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6B, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated by reference into the present disclosure as if fully set forth herein: (i) U.S. Pat. No. 8,443,156 (hereinafter "REF1"); (ii) U.S. Patent Application Publication No. 2014/0122830 (hereinafter "REF2"); (iii) Wikipedia website, Shadow Paging entry (hereinafter "REF3"); (iv) Intel® 64 and IA-32 Architectures Software Developer's Manual, Order Number 325462-054US, April 2015 (hereinafter "REF4"); (v) Enhancing Virtualized Application Performance Through Dynamic Adaptive Paging Mode Selection, by Chang S. Bae et al., dated June 2011 (hereinafter "REF5"); and (vi) Revisiting Hardware-Assisted Page Walks for Virtualized Systems, by Jeongseob Ahn et al., International Symposium on Computer Architecture (ISCA 2012) (hereinafter "REF6"); and (vii) World Intellectual Property Organization International Publication Number WO2014/021919 (hereinafter "REF7").

A problem associated with the out-of-band monitor described above is that the out-of-band monitor cannot allow the OS to directly manipulate the translation regime without first validating its contents. A way to separate software and hardware usage of the page tables would allow an out-of-band monitor to provide the protection of a paging system with minimal overhead.

Figure 1:
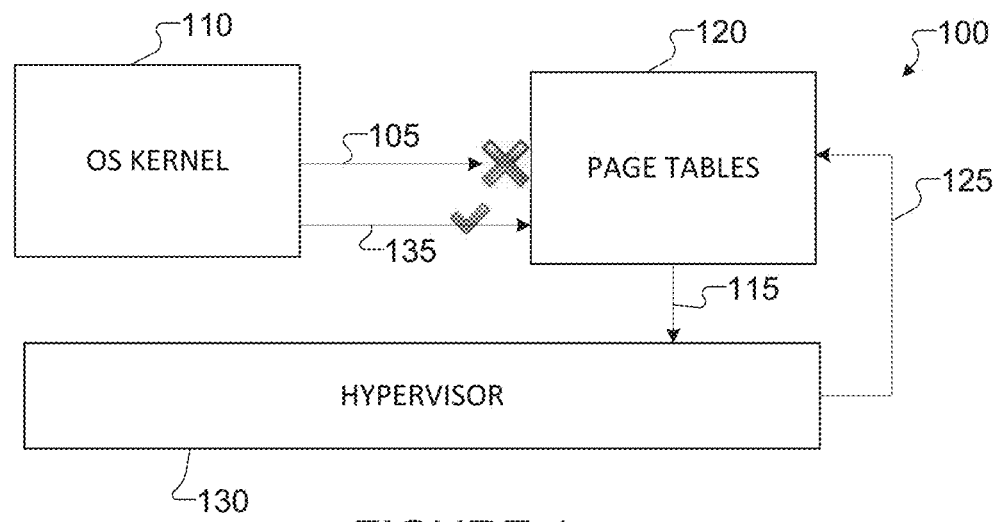
FIG. 1 illustrates operations in a method of writing a single-entry to page tables according to this disclosure.

FIG. 1 illustrates operations in a method 100 of writing a single-entry to page tables according to this disclosure. Other embodiments can be used without departing from the scope of this disclosure.

In operation 105, the OS kernel 110 attempts to access the page tables 120 for translation, but the page tables 120 have a read only status. That is, the hypervisor 130 blocks the OS kernel 110 from writing to the page tables (as shown by the X mark). In response, the OS kernel 110 is directed to the hypervisor. For example, in operation 115, the attempt to access the page tables 120 for translation is redirected to the hypervisor 130. In operation 125, the hypervisor uses the redirected attempt to verify the page tables and to change the status of the page tables, enabling the page tables to be used for translation. In operation 135, the OS kernel 110 attempts to access the page tables 120 for translation, and is successful as the page tables 120 have a status that enables the page tables to be used for translation.

A problem with the method 100 is that each information that the OS kernel 110 writes to the page tables 120 causes a jump to the hypervisor 130. Accordingly, the OS kernel 110 is blocked from repeatedly writing to the page tables 120 without intermediate operations of the hypervisor 130, which results in inefficiencies of the method 100.

Figure 2:
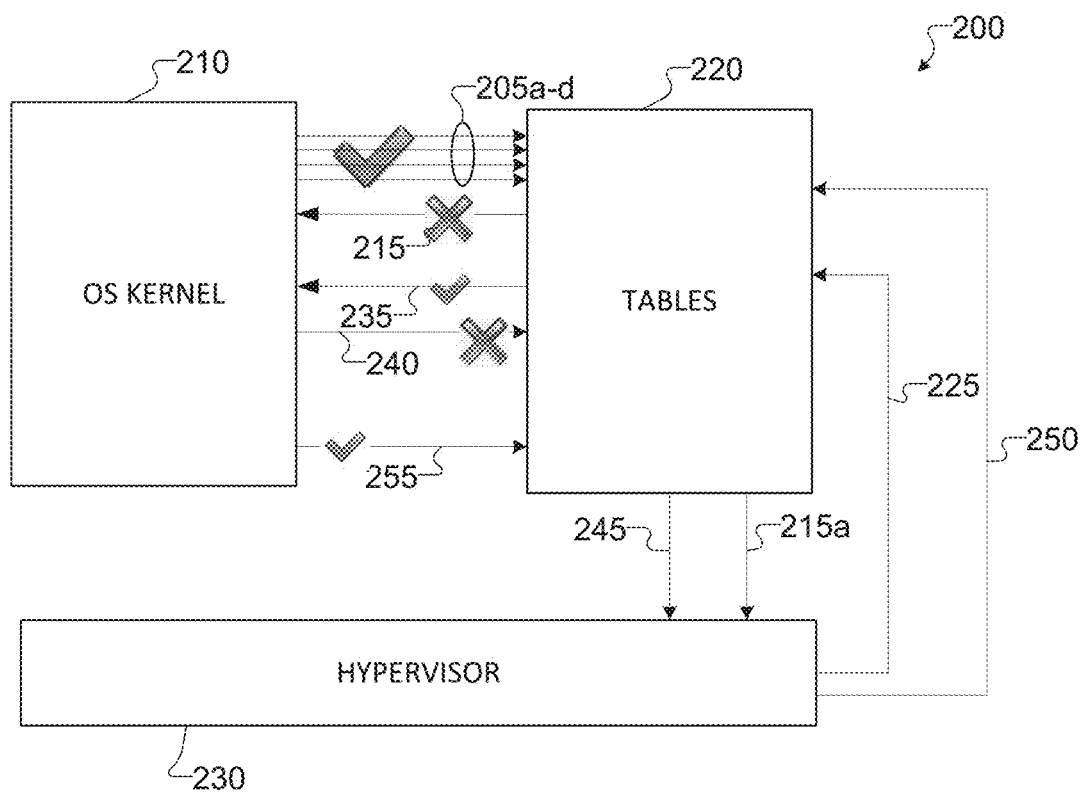
FIG. 2 illustrates operations in a method of multiple-entry writing to page tables according to this disclosure.

FIG. 2 illustrates operations in a method 200 of multiple-entry writing to page tables according to embodiments of the present disclosure. Features of the method 200 can be used for performing Protected Walk-based Shadow Paging. In the method 200, the OS kernel 210 writes information 205a to the tables 220 for translation, and the tables 220 are configured to be not usable for translation. The OS kernel 210 can repeatedly write information 205b-d to the tables 220 for translation. That is, the OS kernel 210 can write to and read from the tables 220, but cannot use any of the information in tables 220 for translation. In response to an attempt to use the tables 220 for translation, the OS kernel 210 receives a device memory fault 215 (such as the device memory fault 440 described in more detail with reference to FIGS. 4 and 5) from the tables 220.

The device memory fault 215 triggers, such as through a fault message 215a corresponding to the device memory fault 215, the hypervisor 230 to verify the tables 220 and to change the status of the tables 220. In operation 225, in response to detecting the device memory fault 215, the hypervisor 230 changes the tables 220 to a read-only status. The read-only status prevents the OS kernel 210 from writing new information to the read-only tables 220 and allows the read-only tables 220 to be used for translation.

Subsequently, in operation 235, when the OS kernel 210 attempts to use the read-only tables 220 for translation, the attempt will be allowed. However, when the OS kernel 210 attempts to write new information 240 to the read-only tables 220, the system of FIG. 2 operates in a similar manner to the system in FIG. 1 when the OS kernel 110 attempts to access the read only page tables 120 for translation, until the hypervisor enables the tables 220 to be writable. That is, the read-only tables 220 redirect the OS kernel 210 to the hypervisor 230 by triggering (such as through a fault message 245 corresponding to a permissions fault) the hypervisor 230 to change the status of the tables 220. The permissions fault is also referred to as a read-only prefetch fault and described in more detail with reference to number 440 in FIGS. 4 and 5. In operation 250, in response to receiving the fault message 245, the hypervisor 230 emulates the write of the new information to the read-only tables 220, similar to the operation 125. In operation 255, the OS kernel 210 attempts to write new information to the tables 220 and is successful as the status of the tables 220 has been changed.

The method 200 provides advantages by allowing the OS kernel 210 to repeatedly read from and write to the tables 220 without hypervisor interference until a device memory fault message 215a indicates that the OS kernel is trying to use unverified table information for translation. The method 200 provides further advantages by allowing the OS kernel 210 to repeatedly read from verified translation information without hypervisor interference until a read-only prefetch fault message 245 indicates that the OS is attempting to use unverified new information to modify verified translation information. The read-only prefetch fault message 245 is output in response to a permissions fault at the tables 220. The permissions fault is described in more detail with reference to number 505 in FIG. 5.

Figure 3A:
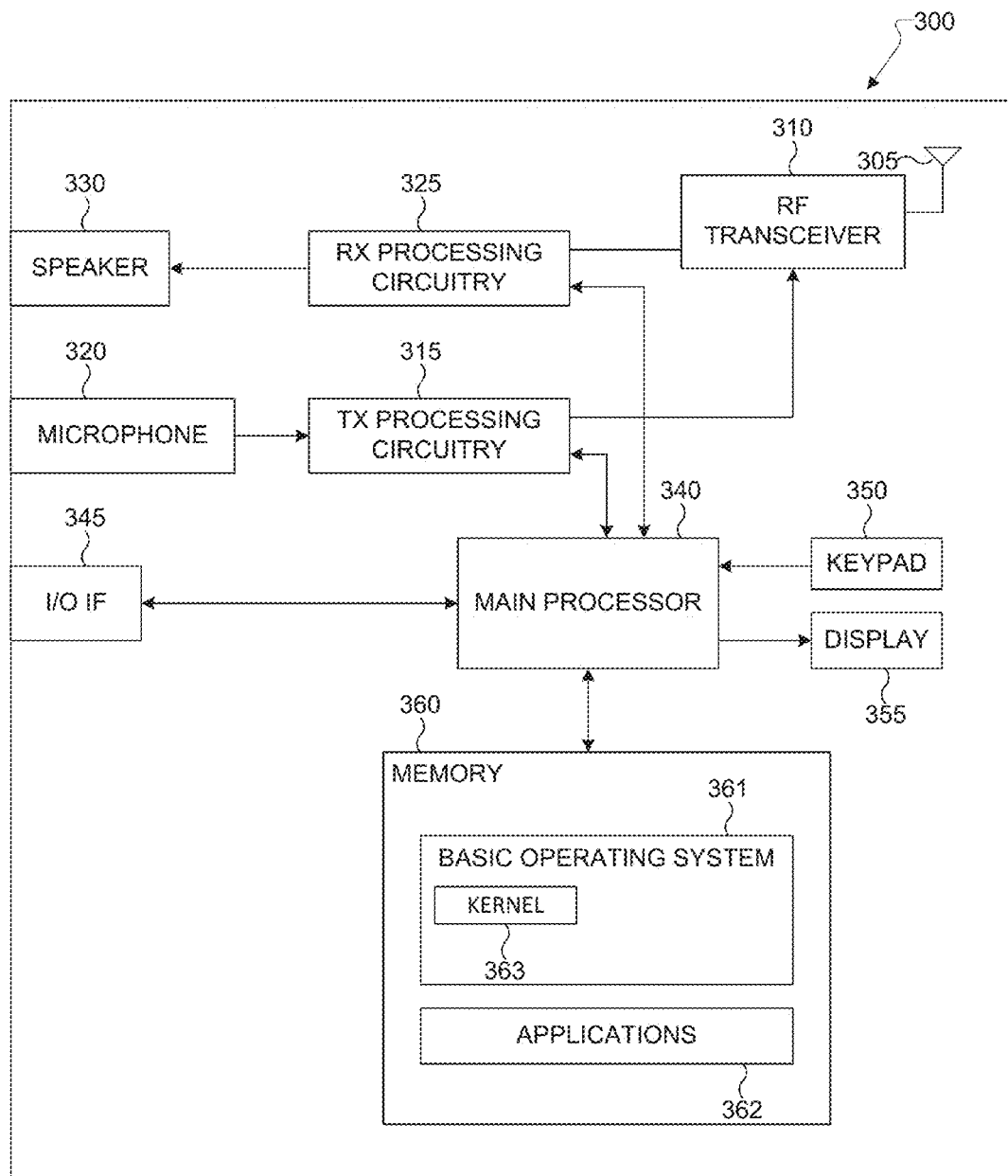
FIGS. 3A and 3B illustrate an example user equipment (UE) according to this disclosure.

FIG. 3A illustrates an example user equipment (UE) 300 according to this disclosure. The embodiment of the UE 300 illustrated in FIG. 3A is for illustration only. However, UEs come in a wide variety of configurations, and FIG. 3A does not limit the scope of this disclosure to any particular implementation of a UE. Examples of the UE 300 include a mobile device, such as a cell phone, a wireless laptop, a wireless personal digital assistant (PDA), or the like.

As shown in FIG. 3A, the UE 300 includes an antenna 305, a radio frequency (RF) transceiver 310, transmit (TX) processing circuitry 315, a microphone 320, and receive (RX) processing circuitry 325. The UE 300 also includes a speaker 330, a main processor 340, an input/output (I/O) interface 345, a keypad 350, a display 355, and a memory 360. The memory 360 includes a basic operating system (OS) program 361 and one or more applications 362.

The RF transceiver 310 receives, from the antenna 305, an incoming RF signal transmitted by an evolved node B (eNB) of a wireless network. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data). The UE 300 receives wireless broadband access to a wireless network through a base station, communicates with other UEs using 5G, LTE, LTE-A, WiMAX, or other advanced wireless communication techniques.

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for performing Protected Walk-based Shadow Paging (PWSP). The main processor 340 can move data into or out of the memory 360 as required by an executing process. In some embodiments, the main processor 340 is configured to execute applications 362 based on the OS program 361 or in response to signals received from eNBs or an operator. The main processor 340 is also coupled to the I/O interface 345, which provides the UE 300 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 300 can use the keypad 350 to enter data into the UE 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

The operating system program 361 includes an OS kernel 363. The OS kernel 363 is critical to the security of the entire system. Hence, it is important to provide tools and techniques that can continuously monitor and protect the integrity of the OS kernel 363. These monitoring tools need to be protected from the OS kernel 363 itself. Otherwise, an attack compromising the OS kernel 363 would directly compromise these monitoring tools. These same monitoring tools and techniques must also be efficient enough to allow the system to operate at a speed similar to as if the monitoring tools were not present.

The UE 300 includes a Protected Table-based Shadow Paging (PTSP) capability with the following properties:
  Allows an OS to directly modify its own page tables;
  Passes execution to an out-of-band monitor only when un-validated translations are about to be used by the MMU, accordingly, no revalidation occurs in response to the system simply switching address spaces;
  Does not require cooperation with an OS in order to ensure validation occurs before usage;
  Requires zero knowledge of OS page table semantics and is capable of performing group based verification; and
  Does not validate page tables that are never used for translation by the MMU;
  Verification still functions in complete compromise of the system outside of the out-of-band monitor, accordingly, any modification of the OS is not required to be trusted.

The UE 300 provides a system within which the PTSP capability operates. That is, the PTSP capability operates within a system that provides the following features: (1) software runs in a privileged execution mode that is capable of interfacing with an MMU and executes in the context of a virtual address space; (2) hardware supports multiple stages of translation (for example, Two Dimensional Paging, Nesting Paging, Stage 2 Page Tables); and (3) hardware provides a mechanism to trap when address translation is taking place with unverified memory (e.g. trap to a fault handler). That is, the UE 300 provides the above listed features to utilize the PTSP capability.

As a technical advantage, embodiments of this disclosure leverage hardware facilities to perform a light weight version of shadow paging. As such, the embodiments of this disclosure boost performance, lower power consumption, and provide a foundation for advanced introspection capabilities that cannot be performed on such devices without a huge impact to the usability of the device.

Although FIG. 3A illustrates one example of UE 300, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 300 configured as a mobile telephone or smartphone, UEs could be configured to operate as other types of mobile or stationary devices.

Figure 3B:
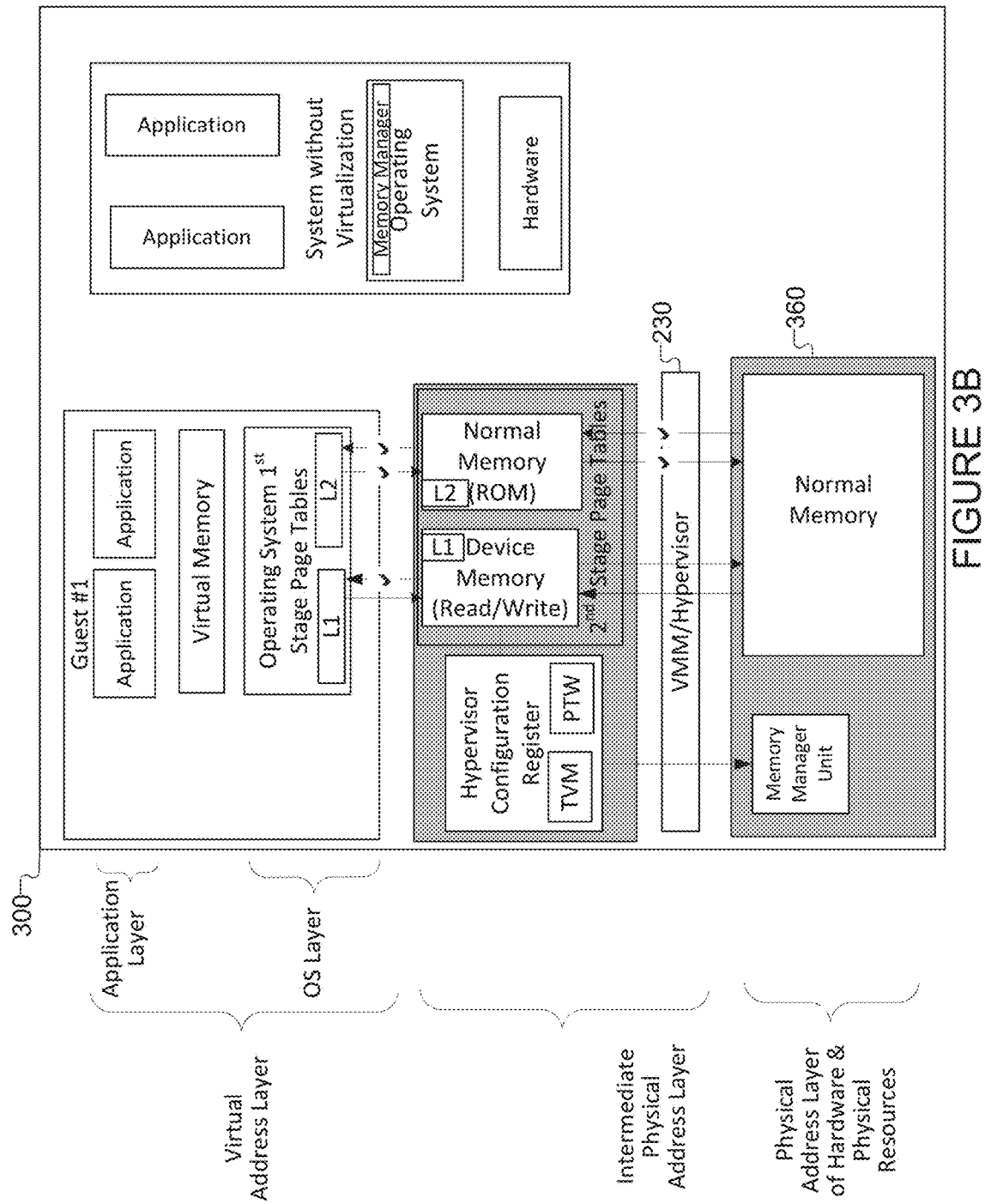

FIG. 3B illustrates the UE 300 of FIG. 3A in greater detail according to this disclosure. As shown, the UE 300 includes a virtualization architecture according to this disclosure. As virtualization has become ubiquitous in the computing world, including the mobile market with the introduction of the Arm® Cortex®-A15 and ARMv8 processors, the usage of virtualization as an out-of-band security monitoring mode has become more advantageous. This is because these type of processors, such as Cortex®-A15 and ARMv8 processors, (i) provide isolation, (ii) have the ability to trap useful system events, and (iii) include additional hardware features that can be used for isolation of system resources. A security hypervisor implementing the out-of-band security monitoring mode has increased performance of the processor when compared to protection by TrustZone® as well as when compared to protection through Nested Page Tables (i.e., ARM® Stage 2 Page Tables).

The mode of execution provides an out-of-band execution area for real-time kernel protection (RKP) technologies to reside. Further, Protected Walk-based Shadow Paging uses the facilities available within the RKP in order to fully take advantage of the potential of Hardware Virtual Machine (HVM) extensions. There are various techniques for implementing real-time monitoring of an operating system kernel 363, such as the implementation described in REF7 (WO2014/021919) which is hereby incorporated by reference in its entirety. RKP inspects the page tables of an OS before the hardware is allowed to use the page tables. This activity of pre-use-inspection requires scanning the page tables either as the page tables are updated or as the page tables are used. In the case of RKP, pre-use-inspection is performed as the page tables are updated. In order to boost the performance of this approach, page table writes are grouped in the kernel and the RKP validates them in a single trap to the out-of-band monitor (this is done with both TrustZone® and hypervisor based monitors with little improvement on performance). It has been identified that the OS doesn't update the page tables in a way that semantically provides good grouping opportunities. The technique of grouping writes provides advantages, as boundary crossing can be expensive, but until the introduction of the HVM extensions lacked a mechanism to implement grouping writes.

The UE 300 includes hardware resources, which can be referred to as belonging to a physical address layer. The hardware resources include various components of the UE 300, such as the memory 360, main processor 340 (e.g., Cortex®-A15 processor or ARMv8 processor), and a memory manager unit (MMU).

The UE 300 includes an intermediate physical address layer above the physical address layer. The intermediate physical address layer includes a virtual machine monitor (VMM or hypervisor), a hypervisor configuration register (HCR), and second stage page tables (S2). The HCR includes a Protected Table-Walk (PTW) bit and a Trap Virtual Memory) bit, both of which are described more particularly below. The second stage page tables include a device memory and a normal memory. In certain embodiments, processing circuitry of the UE 300 is configured to perform the functions disclosed herein. In certain embodiments, second stage page tables include executable instructions which are stored in a memory, such as memory 360, and configured to cause a processor or processing circuitry to perform the functions disclosed herein.

The UE 300 includes a virtual address layer above the intermediate physical address layer. The virtual address layer includes one or more virtual machines (Guest #1). The virtual machine includes an operating system (OS) layer that includes a guest operating system, and operating system $1^{st}$ Stage (Stage 1 or S1) Page Tables. The Stage 1 Page Tables include a first level page table (L1) and a second level page table (L2). The virtual machine includes virtual memory associated with virtual addresses. The virtual machine includes one or more applications in an application layer above the OS Layer.

In certain embodiments, the UE 300 additionally includes a system without virtualization, wherein an operating system corresponds to an OS layer above the hardware layer and below the application layer.

Figure 4:
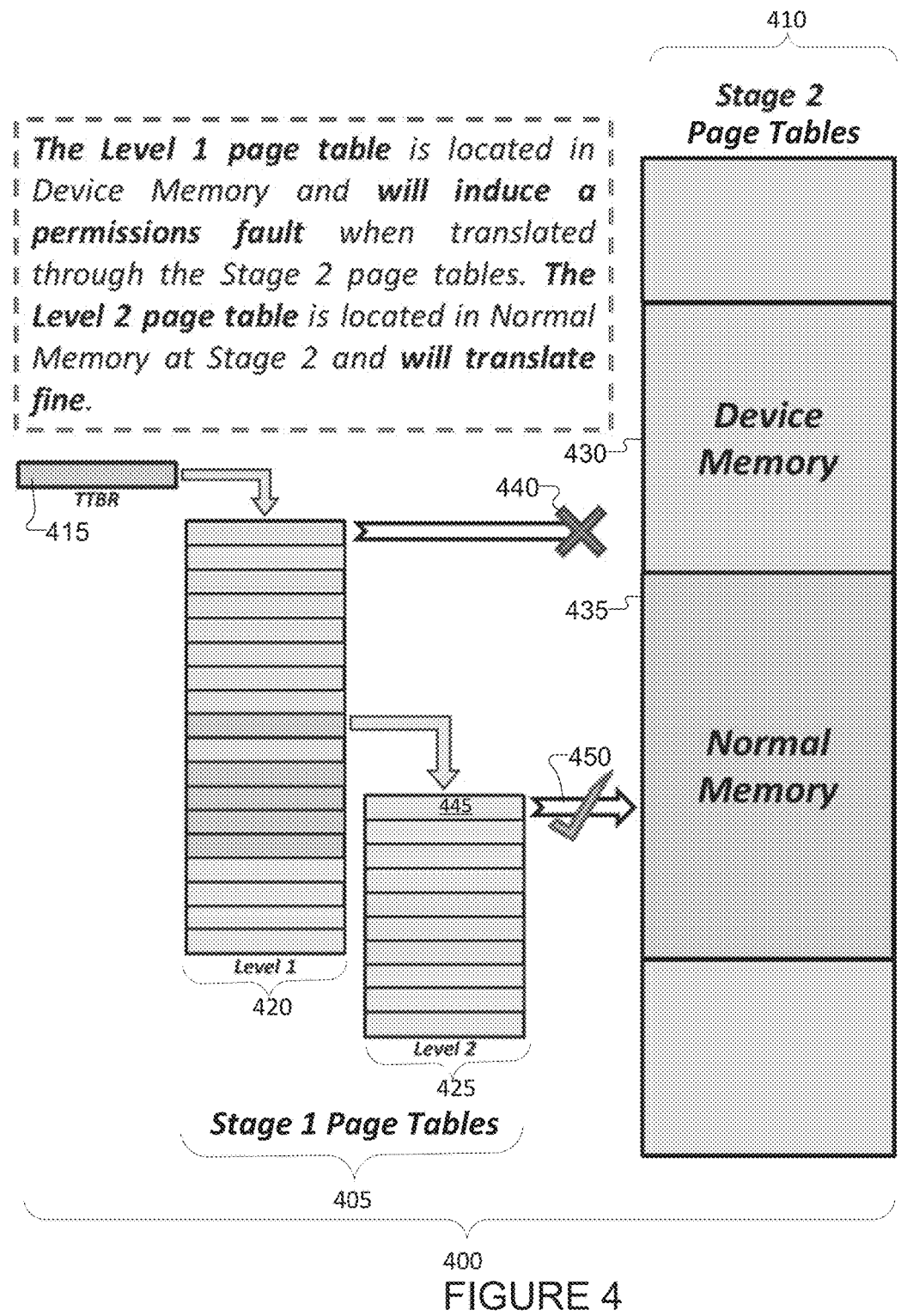
FIGS. 4 and 5 illustrate a Protected Walk-based Shadow Paging (PWSP) architecture according to this disclosure.
Figure 5:
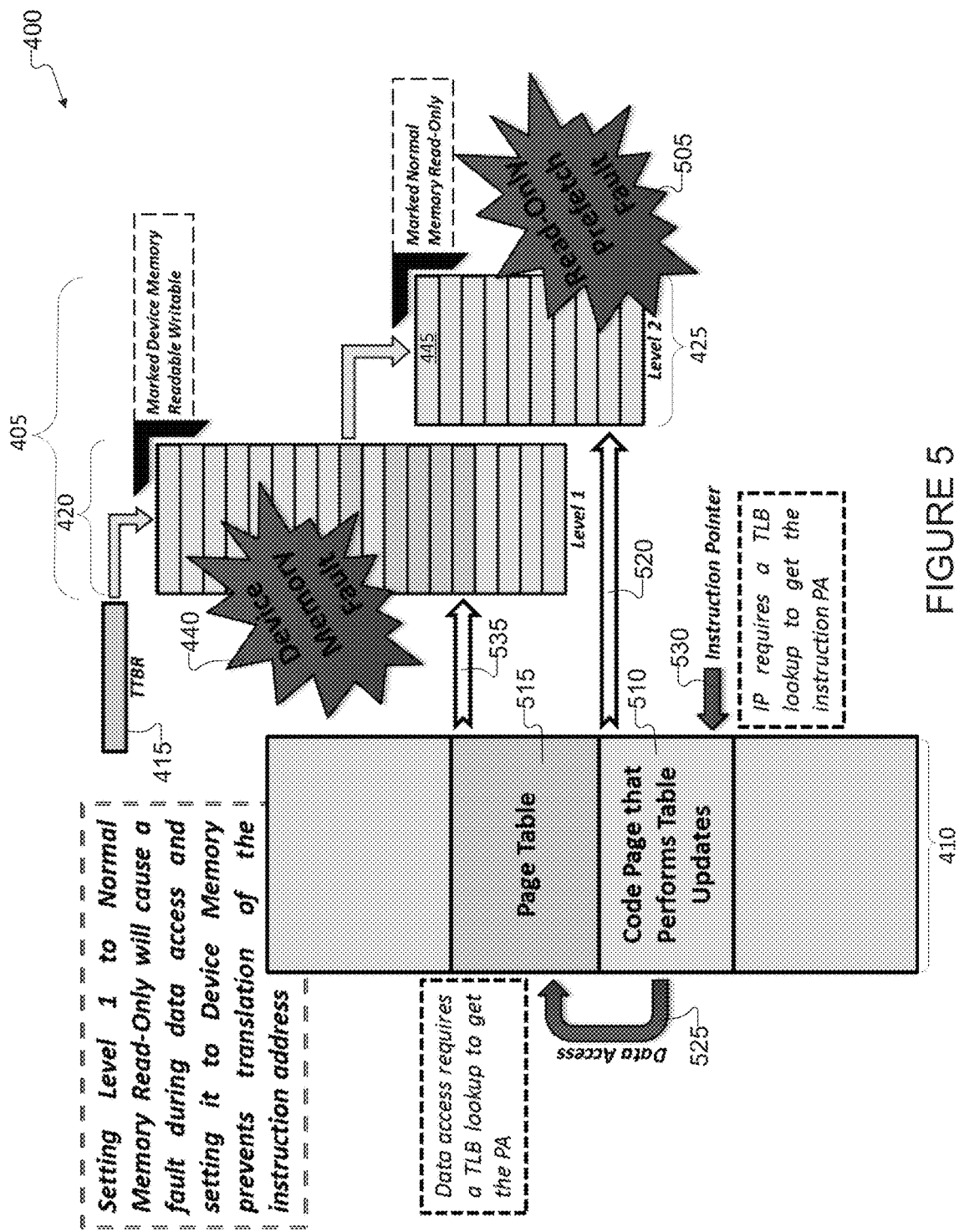

FIGS. 4 and 5 illustrate a Protected Walk-based Shadow Paging (PWSP) architecture 400 according to embodiments of the present disclosure. The PWSP architecture 400 includes multiple levels of address translation, and a differentiator for differentiating software OS access from hardware MMU access to the translation regime. Although certain details will be provided with reference to the components of the Protected Walk-based Shadow Paging (PWSP) architecture 400, it should be understood that other embodiments may include more, less, or different components.

The Protected Walk-based Shadow Paging architecture 400 allows an out-of-band monitoring agent to use hardware facilities to determine when the Memory Management Unit (MMU) is about to use unverified translation regime structures for translation. The embodiments of this disclosure provide multiple benefits for both performance and security including: (1) The OS can manipulate its own page tables without causing traps to the out-of-band monitor; (2) Page tables can be verified in bulk, thus eliminating the number of context switches to the out-of-band monitor; (3) The out-of-band monitor does not verify page tables that are updated by the OS and not used for active translation; and (4) The number of required modifications to the OS is substantially reduced over techniques that trap on all page table entry updates, which boosts compatibility while simultaneously reducing the cost of maintenance.

The Protected Walk-based Shadow Paging architecture 400 provides a foundation for the next generation in Real-Time Kernel Protection (RKP). By eliminating the need to heavily instrument the OS, and by relying on hardware, a system can be protected in a reliable and efficient way. Some processors introduce HVM extensions that include Nested Page Table facilities, but also a version of shadow paging is still required to ensure separation of privilege inside of a guest. Any development of an out-of-band security monitor that includes in-guest protections will need an efficient shadow paging capability. The embodiments of this disclosure specifically target systems running only a single guest OS.

The Protected Walk-based Shadow Paging architecture 400 prevents malicious software from being able to exploit optimizations that make current page table protections feasible (e.g., direct memory access (DMA)). Also, by providing a light weight version of shadow paging, the Protected Walk-based Shadow Paging architecture 400 is also used to support other types of deep introspection capabilities, such as protecting security critical data structures (e.g., structured, struct task struct).

The Protected Walk-based Shadow Paging architecture 400 enables an out-of-band monitor to perform optimized page table verification and enables deep introspection technologies to be built with minimal performance impact.

As shown in FIG. 4, the UE 300 includes the PWSP architecture 400. The PWSP architecture 400 includes Stage 1 Page Tables 405, Stage 2 Page Tables 410, and a Translation Table Base Register (TTBR) 415. The Stage 1 Page Tables 405 includes a Level 1 page table 420 and a Level 2 page table 425. A portion of the Stage 2 Page Tables translates memory as device memory 430, and another portion of the Stage 2 Page Tables 410 translates memory as normal memory 435. The Level 2 page table 425 provides the output 450 of Stage 1 Page Tables 405 to the normal memory 435 of the Stage 2 Page Tables 410. Multiple levels of address translation can be stored as a multiple level page tables structure (e.g., level one (L1) page table, level two (L2) page table, level three (L3) page table, and so on) in the second stage or Stage 2 page tables 410.

For simplicity of explanation, the PWSP architecture 400 and its operation will be discussed in the context of an ARM® hypervisor. ARM®'s Virtualization Extensions (VE) provide two features that are used to implement PWSP. The first is the inclusion of Stage 2 Page Tables 410, which are in addition to the Stage 1 Page Tables 405. The second is a bit called Protected Table Walk located in the Hypervisor Configuration Register (HCR).

Protected Table Walk (PTW) bit is defined in the ARM® Architecture Reference Manual ARMv8 as:

"When this bit is set to 1, if the stage 2 translation of a translation table access made as part of a stage 1 translation table walk at EL0 or EL1 maps that translation table access to Strongly-ordered or Device memory, the access is faulted as a stage 2 Permissions fault. This bit is permitted to be cached in a TLB. Resets to 0."

The intended use of the PTW bit is to allow a Virtual Machine Monitor (VMM) to determine if a guest has "incorrectly" setup its page tables as all page tables should be backed by Normal Memory.

Stage 2 (S2) Page Tables 410 provide an additional layer of translation between a guest and a physical memory. This S2 Page Tables 410 hardware feature eliminates the need to perform vTLB type shadow paging in order to isolate physical memory from guest access. The S2 Page Tables 410 hardware feature provides separation between multiple guests and a guest and its VMM. Instead of an OS directly translating from Virtual Address (VA) to Physical Address (PA), the OS translates from a VA to an Intermediate Physical Address (IPA). The hypervisor maintains complete control of IPA to PA translations and the guest operates without any knowledge of the additional layer. This means when a guest populates its page tables 405 the guest does so with IPAs instead of PAs. That is, in order to perform a complete translation (i.e., VA→IPA→PA) on a TLB miss, an MMU page walker first converts all IPAs in the Stage 1 (S1) page tables 405 to PAs by walking the S2 page tables 410. From a performance standpoint this incurs a number of data accesses expressed by Equation 1.

$$nm+n+m=\text{memory accesses for a single translation} \quad (1)$$

In Equation 1, n represents the number of S1 page table levels to walk, and m represents the number of S2 page table levels to walk to completely translate a single address. The resulting translation is stored in a combined fashion in the TLB. Although this additional layer of translation (i.e., S2 Page Tables 410) seems costly, it can be substantially faster than vTLB type shadow paging. In order to maximize TLB efficiency with multiple layers of paging the largest pages possible should be used at all layers. The introduction of pages at Stage 2 page tables 410 that are smaller than their translation at Stage 1 page tables 405 is called splintering and should be avoided at all cost, as the TLB can only store translations for the smaller page size.

In order to improve performance when virtualizing a system, the amount of traps from the guest to a VMM should be reduced as much as possible. A security hypervisor improves performance of a virtualized system by reducing the amount of traps from the guest to a VMM. In order to ensure a guest is populating its own page tables 405 with legitimate attributes the page tables 405 must be inspected before they are used for any translations. The hypervisor uses a PTW bit and S2 page tables 410 to trap as little as possible, and to trap only on translations that will be used. The hypervisor uses the PTW bit as a tool to differentiate between OS software modifying the page tables and the MMU hardware walking the page tables. The PTW bit indicates that the MMU hardware is walking the page tables because the system will output a permissions fault 440 if the Level 1 page table 420 is not mapped in S2 page tables 410 as Normal Memory. The PTW bit indicates that the OS software is modifying the page tables by marking the Level 2 page table 425 as Read-Only.

Initially identifying if a page of memory is going to be used for translation is required and can be accomplished by watching for modification of a Translation Table Base Register (TTBR) 415. A hypervisor can receive notification of this modification by setting the (Trap Virtual Memory) TVM bit in HCR. Inserting hypercalls in the OS is another viable technique for the hypervisor to receive notification that a page of memory is going to be used for translation.

In a system that does not use a page of memory for a table in a translation regime, the out-of-band monitor is configured to understand this requirement of initially identifying whether a page of memory is going to be used for translation. Such a configuration enables the out-of-band monitor to reset the memory attributes in the S2 page tables 410 to the Normal Memory Readable Writable attribute. Failing to reset the memory attributes in the S2 page tables 410 to the Normal Memory Readable Writable attribute can cause degraded performance as the OS will be forced to access memory with the Device Memory attribute. Certain embodiments of this disclosure avoid such a failure by adding a hypercall to the OSs page table free function that will inform the hypervisor that the memory will no longer be used for a page table. During this call, the hypervisor needs to inspect only the current translation regime to ensure that the page of memory is not actively being used. Failing to perform this step does not compromise security in any way, instead such a failure degrades performance. This means that even if an attacker could avoid the call the attacker still does not compromise security and thus has no incentive to do so.

Figure 6A:
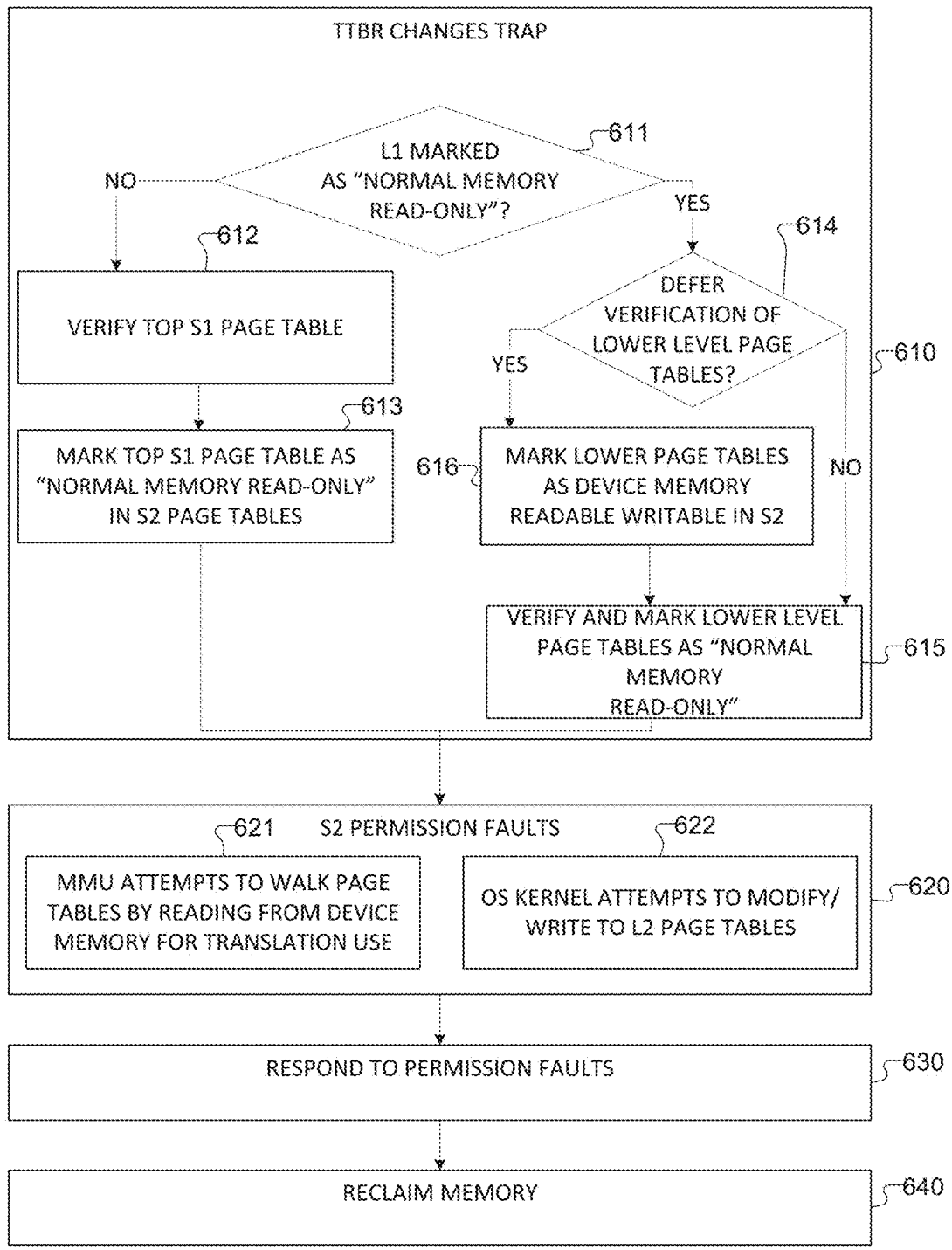
FIGS. 6A and 6B illustrate a process of performing PWSP according to this disclosure.
Figure 6B:
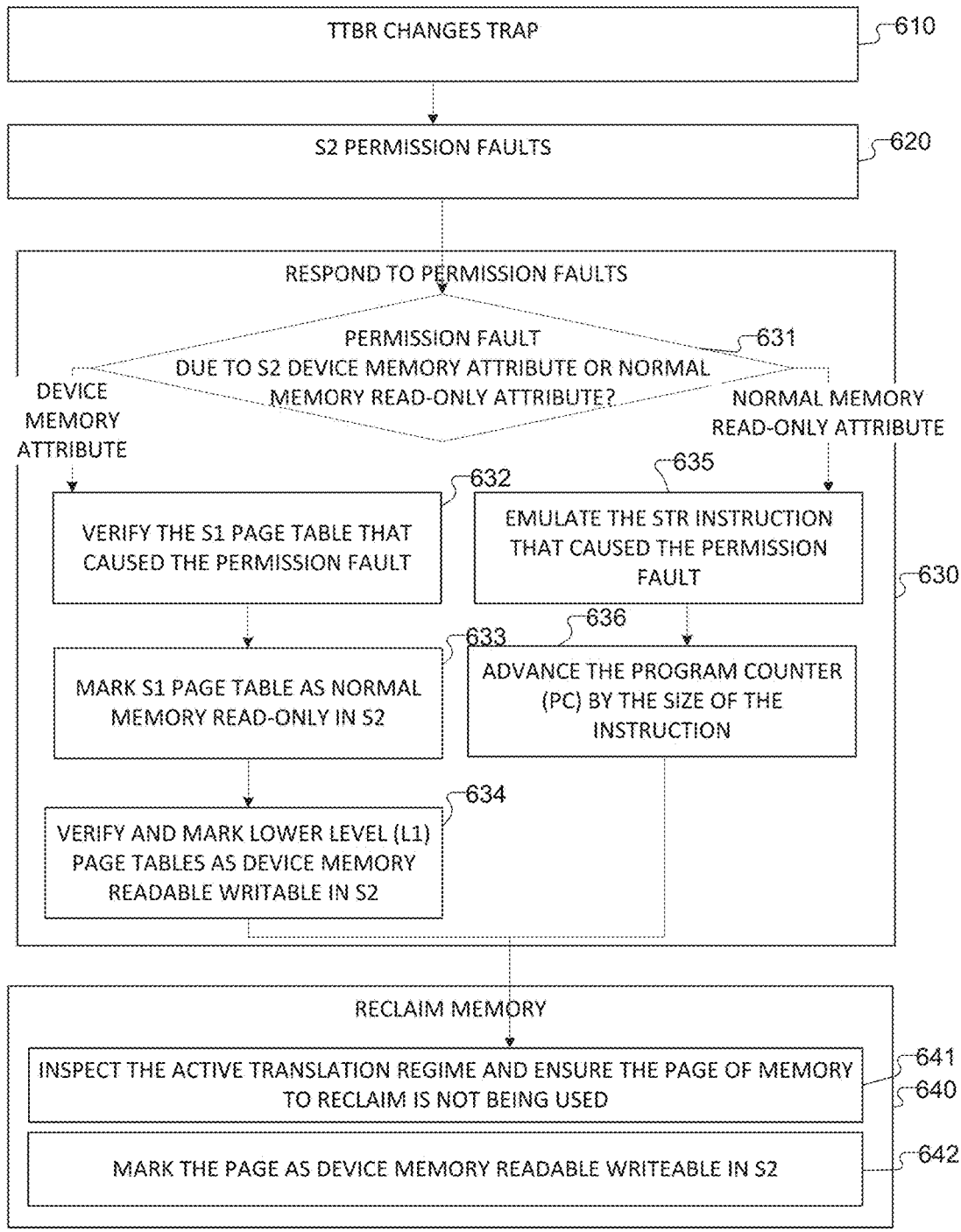

FIGS. 6A and 6B illustrate a process 600 of performing PWSP according to this disclosure. Other embodiments could be used without departing from the scope of this disclosure. For ease of explanation, the UE 300 implements the process 600 with its virtualization features. The technique within the process 600 of performing PWSP can be repeated for as many levels of page tables the device has in its multiple level page tables structure.

In block 610, the TTBR 415 changes trap. That is, the TTBR 415 determines whether the first level of translation is marked as Normal Memory Read-Only. More precisely, the TTBR determines whether the Level 1 Page Table 420 is marked as Normal Memory Read-Only (block 611). If the Level 1 Page Table 420 is not marked Normal Memory Read-Only, the TTBR 415 verifies the top S1 page table (block 612) and marks it as Normal Memory Read-Only in the S2 page tables (block 613). In FIGS. 4 and 5, the top S1 page table is referred to by reference number 445. If the Level 1 Page Table 420 is marked as Normal Memory Read-Only in block 611, then in block 614, the hypervisor determines whether to defer verification and marking of the lower level (Level 1) page table 420 as Normal Memory Read-Only.

In block 615, without deferral, the TTBR 415 verifies the lower level (Level 1) page table 420 and marks it as Normal Memory Read-Only. Note that the term "verify" is intended to be a placeholder for any rule based verification that seems appropriate. At a minimum, the page table descriptors should be inspected. The amount of verification that takes place can vary depending on if future trap paths can be predicted. For example, all tables needed for the translation for the faulting VA could be verified in a single trap.

In block 616, the verification and marking can be deferred by marking lower level (Level 1) page table 420 as Device Memory Readable Writeable in the Stage 2 Page Tables 410. An example of lower level page tables is when all entries in the L1 page tables point to valid L2 page tables. These L2 page tables are marked as device memory readable writable. After the deferral period, the process 600 proceeds to block 615. Note that forcing all software modifications of its page tables to be performed on memory that is mapped as Device Memory means that all writes are uncached. Other attributes can still be applied to the memory which should reduce the performance impact of uncached accesses, such as Gathering, Reordering and Early Write Acknowledgement. The process 600 proceeds to block 620 from either bock 615 or block 613.

In block 620, the Stage 2 Page Tables 410 generate permission faults. For example, in block 621, if the Level 1 page table 420 is not mapped in the Stage 2 Page Tables 410 as Normal Memory 435, then when the MMU hardware attempts to walk Level 1 page table 420 from Device Memory 430, in response, the Stage 2 Page Tables 410 generate a permission fault 440. That is, the Stage 2 Page Tables 410 outputs a fault message to the hypervisor, such as the device memory fault message 215a of FIG. 2. As another example, in block 622, if the Level 2 page table 425 is marked Normal Memory Read Only, then when the OS kernel attempts to modify the page tables by writing to the Level 2 Page table 425, in response, the Stage 2 Page Tables 410 generate a permission fault, which is a Read-Only prefetch fault, 505. That is, the Stage 2 Page Tables 410 output a fault message to the hypervisor, such as the read-only prefetch fault message 245 of FIG. 2.

The process 600 proceeds to block 630 from either block 621 or block 622. More particularly, the process 600 proceeds to block 631 (FIG. 6B) from block 621 or block 622.

In block 630 (shown in FIGS. 6A and 6B), the hypervisor detects and responds to the permission faults. In block 631 (FIG. 6B), the hypervisor detects and determines a cause of a permission fault 440 or 505. That is, in response to detecting the permission fault 440, the hypervisor determines that the cause is due to a Stage 2 Page Tables 410 Device Memory attribute, and the process proceeds to block 632. Alternatively, in response to detecting the permission fault 505, the hypervisor determines that the cause is due to a Stage 2 Page Tables 410 Normal Memory Read-Only attribute, and the process proceeds to block 635.

In block 632, the hypervisor verifies the S1 page table that caused the S2 permission fault. More particularly, the hypervisor verifies the single entry that the MMU attempted to walk from the Device Memory 430. In block 633, the hypervisor marks the Stage 1 page tables 405 as Normal Memory Read-Only in S2. In block 634, the hypervisor verifies the lower level (Level 1) page table 420 and marks it Device Memory Readable Writeable. An example of lower level (L1) page tables is when all entries in the L1 page table points to valid L2 page tables. These L2 page tables are marked as device memory readable writable. That is, in block 634, the hypervisor marks the Level 2 page table 420 as Device Memory Readable Writeable in the Stage 2 Page Tables 410. By marking lower level (Level 1) page table 420 as Device Memory Readable Writeable in the Stage 2 Page Tables 410, the hypervisor can defer verifying and marking the lower level (Level 1) page table 420 as Normal Memory Read-Only.

In block 635, the hypervisor emulates the store register word (str) instruction that caused the fault. In block 636, the hypervisor advances the program counter (pc) by the size of the instruction.

In block 640, the hypervisor reclaims memory. More particularly, the process 600 proceeds to block 641 from block 634. In block 641, the hypervisor inspects the active translation regime and ensures that the page of memory to reclaim is not being used for translation. In block 642, the hypervisor marks the page as Device Memory Readable Writable in the Stage 2 Page Tables 410.

As a technical advantage, block 635 eliminates an infinite loop. The code 510 that is responsible for updating the page tables 405 in an active translation regime is located within the Virtual Address space. Consequently, the code 510 must be translated to execute, namely, by performing an instruction fetch 520. The page table 425 being modified from within a Virtual Address space also needs to be translated, namely, by performing a data access 525. If the page table 425 being updated is responsible for any part of the translation for the instruction pointer 530 implementing the page table update, an infinite loop of permission faults and S2 attribute updates will be generated by the S2 Page tables 405. If the page table 425 to be updated is marked Normal Memory Read-Only, a permissions fault 505 will occur when the code 510 tries to perform a write 520. In response to the permissions fault 505, the hypervisor will update the attributes of the L2 page table 425 in S2 Page tables 405 to the Device Memory Readable Writable attribute. When the address or instruction pointer 530 storing the code 510 that is responsible for updating a page table 425 is translated 535 (i.e., attempts to perform a read) another permissions fault 440 will occur because the L1 page table 420 used for the translation is marked as Device Memory. Effectively, this means that a cycle of data abort, due to Read-Only permissions, and prefetch abort, due to the Device Memory attribute, will never stop. In block 635 (FIG. 6B), by emulating the first write 520 on an S2 permissions fault 505 when the memory is Read-Only ensures that the update of the L2 page table 425 will succeed and that subsequent updates will not be trapped unless used for translation before the next update. This particular case is not the usual path and should not be encountered frequently.

Besides the first trap or permissions fault 505 to switch a page table 425 to writable and another trap or permissions fault 440 to switch the page table 425 to read-only, the OS kernel incurs zero traps. This means the OS kernel could update every single entry in a page table 425 and only detect one trap or permissions fault 505 for the first modification and detect only one other trap or permissions fault 440 if the page table 420 is used for translation. It should also be noted that the steps include no maintenance for address space changes. The out-of-band monitor in the hypervisor is able to keep track of all page tables used in the system, and if the page tables have not been modified since the last use for translation, the system will incur zero performance impact when the page tables are used again.

PWSP provides a minimalistic approach to translation regime verification. PWSP leverages hardware facilities to solve to an otherwise intense performance reducing security process. Furthermore, PWSP allows an out-of-band monitor to introspect and verify the integrity of an OS without aggressive source code modification.

The Protected Walk-based Shadow Paging (PWSP) of this disclosure can be applied to any security monitor that is capable of accommodating the requirements described above. Other out-of-band security monitors require the ability to detect and prevent compromise of guests operating in their protection domain. Watching translation regime modifications in an efficient way can ensure that certain types of exploitation cannot take place, and advanced rootkit style functionality is not installed or allowed to persist.

In certain embodiments, the second stage page tables are configured to map the entire memory including first stage page tables which are comprised of a level one (L1) page table and a level two (L2) page table. In a certain apparatus embodiment, an apparatus that uses hardware virtualization includes two sets of page tables. The first set, namely first stage page tables, are used to define the memory translation and access permission of the OS relative to pseudo physical memory, such as, an intermediate physical memory address (for example, an Intermediate Physical Address (IPA) or Guest Physical Address (GPA), or the like). The output of the translation performed by the first stage page tables is a pseudo physical address (e.g., an intermediate physical address) that gets translated again by the second set, namely second stage page tables. The output of the translation performed by the second stage page tables is the actual physical address and the final permission that will be allowed by this memory translation, which are the most restrictive from set one and two. The first stage page tables are usually controlled by the OS, while the second stage is usually controlled by the hypervisor. Each of the two sets can have multiple levels in a tree-like structure. For example, the first stage page tables might consist of a level one (L1) page table, wherein each entry of the L1 page table points to the level two (L2) page table. The apparatus includes a hypervisor configuration register, such as the HCR register present in ARM® architecture, configured to prevent first stage page table walks on device memory, such as the protected table walk (PTW) bit present in the ARM® architecture. The apparatus includes a hypervisor to configure the OS memory (using the second stage page tables) as following: when the L1 page table is marked according to a Device Memory Readable Writable (DMRW) attribute: (i) permit an operating system (OS) to write to at least one entry in the L1 page table, (ii) block a memory management unit (MMU) from using the L1 page table for translation, and (iii) in response to blocking the MMU, a fault will occur if the L1 is used for translation. When this fault is received by the security monitor in the hypervisor, the hypervisor can verify the L1 page table for translation and change the marking of the L1 page table according to a Normal Memory Read Only (NMRO) attribute, enabling the MMU to subsequently use the L1 page table for translation.

The hypervisor additionally configures the OS so that the L1 page table is marked according to the NMRO attribute to: (i) permit the OS to read from the L1 page table for translating from a virtual address to an intermediate physical address (IPA) to a physical address, (ii) block the OS from writing to the L1 page table, and (iii) in response to blocking the OS, update the L1 page table from this point to be performed through the security monitor in the hypervisor world.

In a certain method embodiment, a method for performing Protected Walk-based Shadow Paging includes storing level one (L1) and level two (L2) page tables in second stage page tables. The method includes storing a protected table walk bit in a hypervisor configuration register. The L1 page table may be marked according to a Device Memory Readable Writable (DMRW) attribute: (i) permitting an operating system (OS) to write to at least one entry in the L1 page table, (ii) blocking a memory management unit (MMU) from reading from the L1 page table for translation, and (iii) when the MMU attempts to read from the L1 page table for translation, the hypervisor trapping the event and verifying the L1 page table for translation, and changing the marking of the L1 page table according to a Normal Memory Read Only (NMRO) attribute, enabling the MMU to subsequently read from the L1 page table for translation. The L1 page table may be marked according to the NMRO attribute: (i) permitting the OS to read from the L1 page table for translating from a virtual address to an intermediate physical address (IPA) to a physical address, (ii) blocking the OS from writing to the L1 page table, and (iii) in response to blocking the OS, updating the L1 page table and changing the marking of the L2 page table (which is pointed to by the L1 page table entry) according to the DMRW attribute, enabling the OS to subsequently write to the L2 page table without using the L2 page table for translation. Hence, the same can be repeated until the last level of page tables.

In a certain system embodiment, a system for performing Protected Walk-based Shadow Paging comprises an operating system configured to translate from a virtual address to an Intermediate Physical Address (IPA) using first stage page tables. The first stage page tables include a level one (L1) page table and a level two (L2) page table. The system includes a hypervisor configured to translate from the IPA to a Physical Address. The hypervisor includes second stage page tables configured to store the L1 and L2 page tables according to different memory attributes. In certain embodiments, processing circuitry of a UE, such as UE 300, is configured to perform the functions disclosed herein. In certain embodiments, second stage page tables include executable instructions which are stored in a memory, such as memory 360, and configured to cause a processor or processing circuitry to perform the functions disclosed herein. The hypervisor includes a hypervisor configuration register (HCR) configured to store a protected table walk (PTW) bit. The hypervisor includes processing circuitry configured to: when the L1 page table is marked according to a Device Memory Readable Writable (DMRW) attribute: (i) permit the OS to write to at least one entry in the L1 page table, (ii) block a memory management unit (MMU) from reading from the L1 page table for translation, and (iii) in response to blocking the MMU, verify the L1 page table for translation and change the marking of the L1 page table according to a Normal Memory Read Only (NMRO) attribute, enabling the MMU to subsequently read from the L1 page table for translation. The processing circuitry is additionally configured to: when the L1 page table is marked according to the NMRO attribute: (i) permit the OS to read from the L2 page table for translating from a virtual address to an intermediate physical address (IPA) to a physical address, (ii) block the OS from writing to the L1 page table, and (iii) in response to blocking the OS, update the L2 page table and change the marking of the L1 page table according to the DMRW attribute, enabling the OS to subsequently write to the L1 page table.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus comprising:
   second stage page tables storing first stage page tables in a memory of the apparatus, the first stage page tables comprising a level one (L1) page table and a level two (L2) page table;
   a hypervisor configuration register (HCR) configured to store a protected table walk (PTW) bit; and
   processing circuitry configured to:
   when the L1 page table is marked according to a first attribute:
   permit an operating system (OS) to write to at least one entry in the L1 page table, block a memory management unit (MMU) of the
apparatus from reading from the L1 page table for
translation,
when the MMU attempts to read the L1 page table
for translation, trap an event to an isolated security
monitor of the apparatus, and
in response to trapping the event to the isolated
security monitor, verify the L1 page table for
translation and change the marking of the L1 page
table according to a second attribute, enabling the
MMU to subsequently read from the L1 page table
for translation; and
when the L1 page table is marked according to the
second attribute:
permit the OS to read from the L1 page table for
translating from a virtual address to an intermediate physical address (WA) to a physical address,
block the OS from writing to the L1 page table,
when the OS attempts to write to the L1 page table
for translation, trap an event to the isolated security monitor, and
in response to trapping the event to the isolated
security monitor, block the OS, update the L1 page
table and change the marking of the L2 page table
that is pointed to by the updated L1 page table
entry according to the first attribute, enabling the
OS to subsequently write to the L2 page table.

2. The apparatus of claim 1, wherein:
blocking the MMU from reading from the L1 page table
for translation comprises generating a device memory
permissions fault; and
blocking the OS from writing to the L1 page table
comprises generating a read-only prefetch permissions
fault.

3. The apparatus of claim 2, wherein changing the marking of the L2 page table comprises:
emulating a store register word (str) instruction that
caused the read-only prefetch permissions fault; and
advancing a program counter (pc) of the apparatus by a
size of a str instruction.

4. The apparatus of claim 1, wherein permitting the OS to
write to the at least one entry in the L1 page table comprises:
permitting the OS to repeatedly write to the L1 page table
such that the at least one entry in the L1 page table
points to one or more L2 page tables of the first stage
page tables.

5. The apparatus of claim 1, wherein the processing
circuitry is further configured to:
insert a hypercall to a page table free function of the OS;
and
determine that a page of memory will no longer be used
for a page table in response to receiving the hypercall.

6. The apparatus of claim 5, wherein the processing
circuitry is further configured to:
in response to receiving the hypercall, inspect only a
current translation regime to determine that the page of
memory is not actively being used for a page table.

7. The apparatus of claim 1, wherein the first attribute is
a Device Memory Readable Writable (DMRW) attribute,
and wherein the second attribute is a Normal Memory Read
Only (NMRO) attribute.

8. The apparatus of claim 1, wherein the processing
circuitry is further configured to detect that a page of
memory is no longer being used for translation by:
setting a trap virtual memory bit in the HCR, wherein the
trap virtual memory bit indicates modification of a
translation table base register of the apparatus.

9. A method comprising:
storing a multiple level first stage page tables structure in
second stage page tables, the multiple level first stage
page tables structure including a level one (L1) page
table and a level two (L2) page table;
storing a protected table walk (PTW) bit in a hypervisor
configuration register (HCR);
when the page tables of the multiple level first stage page
tables structure are marked according to a first attribute,
using processing circuitry to perform the operations of:
permitting an operating system (OS) to write to at least
one entry in the page tables of the multiple level first
stage page tables structure,
blocking a memory management unit (MMU) from
reading from the page tables of the multiple level
first stage page tables structure for translation,
when the MMU attempts to read the page tables of the
multiple level first stage page tables structure for
translation, trapping an event to an isolated security
monitor, and
in response to trapping the event to the isolated security
monitor, verifying the page tables of the multiple
level first stage page tables structure for translation
and changing the marking of the page tables of the
multiple level first stage page tables structure according to a second attribute, enabling the MMU to
subsequently read from the page tables of the multiple level first stage page tables structure for translation; and
when the page tables of the multiple level first stage page
tables structure are marked according to the second
attribute, using processing circuitry to perform the
operations of:
permitting the OS to read from the page tables of the
multiple level first stage page tables structure for
translating from a virtual address to an intermediate
physical address (WA) to a physical address,
blocking the OS from writing to the page tables of the
multiple level first stage page tables structure, and
in response to blocking the OS, updating the page
tables of the multiple level first stage page tables
structure and changing markings of subsequent page
tables of the multiple level first stage page tables
structure according to the first attribute, enabling the
OS to subsequently write to the page tables of the
multiple level first stage page tables structure,
wherein changing the markings of the subsequent page
tables includes at least one of: marking the L2 page
table for entries in the L1 page table or marking an
L3 page table for entries in the L2 page table.

10. The method of claim 9, wherein:
blocking the MMU from reading from the page tables of
the multiple level first stage page tables structure for
translation comprises generating a device memory permissions fault; and
blocking the OS from writing to the page tables of the
multiple level first stage page tables comprises generating a read-only prefetch permissions fault.

11. The method of claim 10, wherein updating the page
tables of the multiple level first stage page tables structure
comprises:
emulating a store register word (str) instruction that
caused the read-only prefetch permissions fault; and
advancing a program counter (pc) by a size of a str
instruction.

12. The method of claim 9, wherein permitting the OS to write to the at least one entry in the page tables of the multiple level first stage page tables structure comprises:
permitting the OS to repeatedly write to the L1 page table such that the at least one entry in the page tables of the multiple level first page tables structure points to one or more L2 pages of the multiple level first stage page tables structure or points to one or more other level pages of the multiple level first stage page tables structure.

13. The method of claim 9, further comprising detecting that a page of memory is no longer being used for translation by:
setting a trap virtual memory bit in the HCR, wherein the trap virtual memory bit indicates modification of a translation table base register.

14. The method of claim 9, further comprising:
inserting a hypercall to a page table free function of the OS; and
determining that a page of memory will no longer be used for a page table in response to receiving the hypercall.

15. The method of claim 14, further comprising:
in response to receiving the hypercall, inspecting only a current translation regime to determine that the page of memory is not actively being used for a page table.

16. The method of claim 9, wherein the first attribute is a Device Memory Readable Writable (DMRW) attribute, and wherein the second attribute is a Normal Memory Read Only (NMRO) attribute.

17. A system comprising:
a processor;
a computer readable storage medium electronically coupled to the processor; and
a plurality of instructions wherein at least a portion of the plurality of instructions are stored in the computer readable storage medium, and wherein the plurality of instructions, when executed, cause the processor to perform steps of:
controlling an operating system (OS) to translate from a virtual address to an Intermediate Physical Address (IPA) using first stage page tables of the system, wherein the first stage page tables comprise a multiple level first stage page tables structure that includes a level one (L1) page table and a level two (L2) page table; and
controlling a hypervisor of the system to translate from the IPA to a Physical Address, the hypervisor comprising second stage page tables configured to store the L1 and L2 page tables according to different memory attributes and a hypervisor configuration register (HCR) configured to store a protected table walk (PTW) bit,
wherein the instructions, when executed, and when the L1 page table is marked according to a first attribute, further cause the processor to perform the steps of: (i) permitting the OS to write to at least one entry in the L1 page table, (ii) blocking a memory management unit (MMU) of the system from reading from the L1 page table for translation, and (iii) when the MMU attempts to read the L1 page table for translation, trapping an event to an isolated security monitor of the system, and (iv) in response to trapping the event to the isolated security monitor, verifying the L1 page table for translation and changing the marking of the L1 page table according to a second attribute, enabling the MMU to subsequently read from the L1 page table for translation; and wherein the instructions, when executed, and when the L1 page table is marked according to the second attribute, further cause the processor to perform the steps of: (i) permitting the OS to read from the L1 page table for translating from a virtual address to an intermediate physical address (WA) to a physical address, (ii) blocking the OS from writing to the L1 page table, (iii) when the OS attempts to write to the L1 page table for translation, trapping an event to the isolated security monitor, and (iv) in response to trapping the event to the isolated security monitor, blocking the OS, updating the L1 page table and changing the marking of the L2 page table that is pointed to by the updated L1 page table entry according to the first attribute, enabling the OS to subsequently write to the L2 page table.

18. The system of claim 17, wherein the plurality of instructions that cause the processor to perform the step of blocking the MMU from reading from the L1 page table for translation comprises instructions that, when executed, cause the processor to perform a step of generating a device memory permissions fault; and
the plurality of instructions that cause the processor to perform the step of blocking the OS from writing to the L1 page table comprises instructions that, when executed, cause the processor to perform a step of generating a read-only prefetch permissions fault.

19. The system of claim 18, wherein the instructions that, when executed, cause the processor to perform the step of changing the marking of the L2 page table cause the processor to perform steps of:
emulating a store register word (str) instruction that caused the read-only prefetch permissions fault; and
advancing a program counter (pc) of the system by a size of a str instruction.

20. The system of claim 17, wherein the instructions that cause the processor to perform the step of permitting the OS to write to the at least one entry in the L1 page table, when executed, cause the processor to perform a step of:
permitting the OS to repeatedly write to the L1 page table such that the at least one entry in the L1 page table points to one or more L2 page tables of the multiple level first stage page tables structure.

21. The system of claim 17, wherein the plurality of instructions, when executed, further cause the processor to perform a step of detecting that a page of memory is no longer being used for translation by:
setting a trap virtual memory bit in the HCR, wherein the trap virtual memory bit indicates modification of a translation table base register of the system.

22. The system of claim 17, wherein the plurality of instructions when executed, further cause the processor to perform steps of:
inserting a hypercall to a page table free function of the OS;
determining that a page of memory will no longer be used for a page table in response to receiving the hypercall; and
in response to receiving the hypercall, inspecting only a current translation regime to determine that the page of memory is not actively being used for a page table.

23. The system of claim 17, wherein the first attribute is a Device Memory Readable Writable (DMRW) attribute, and wherein the second attribute is a Normal Memory Read Only (NMRO) attribute.

24. The system of claim 17, wherein the multiple level page tables structure includes three or more levels of page tables, including the L1 page table, the L2 page table, and a level three (L3) page table and L4 page tables.

* * * * *